(12) United States Patent
Nahmad

(10) Patent No.: US 8,197,667 B2
(45) Date of Patent: Jun. 12, 2012

(54) METHOD TO RECOVER CRUDE OIL FROM SLUDGE OR EMULSION

(75) Inventor: David Gandhi Nahmad, Anaheim, CA (US)

(73) Assignee: Scomi Ecosolve, Limited, Tortola (VG)

( * ) Notice: Subject to any disclaimer, the term of this patent is extended or adjusted under 35 U.S.C. 154(b) by 498 days.

(21) Appl. No.: 12/397,627

(22) Filed: Mar. 4, 2009

(65) Prior Publication Data

US 2009/0223858 A1    Sep. 10, 2009

(51) Int. Cl.
*C10G 17/00*    (2006.01)
(52) U.S. Cl. .......................................................... 208/13
(58) Field of Classification Search ...................... 208/13
See application file for complete search history.

(56) References Cited

U.S. PATENT DOCUMENTS

| | | | |
|---|---|---|---|
| 3,819,508 A * | 6/1974 | Fainman et al. | 208/181 |
| 3,835,035 A * | 9/1974 | Fainman et al. | 208/181 |
| 4,411,814 A | 10/1983 | Burkhardt | |
| 5,391,304 A * | 2/1995 | Lantos | 210/774 |
| 5,558,768 A | 9/1996 | Ikura et al. | |

OTHER PUBLICATIONS

PCT, International Search Report, PCT/US2010/025985, Oct. 11, 2010.
PCT, International Preliminary Report, PCT/US2010/025985, Sep. 6, 2011.

* cited by examiner

*Primary Examiner* — Randy Boyer
(74) *Attorney, Agent, or Firm* — George S. Gray

(57) ABSTRACT

Recovering crude oil by separating and removing valuable hydrocarbon, water and solid components from sludge or an emulsion. A sludge or an emulsion with added reagents of predefined ratio is received to form a mixture for treatment. The mixture is processed to break a micelle structure of the sludge or the emulsion. The mixture is agitated to allow homogenization thereof. The processed mixture is centrifuged to separate hydrocarbons, water and solids from the sludge or the emulsion. The separated hydrocarbons are tested to ensure separated solids are disposed as environmentally safe materials. Basis solids and water contents of separated hydrocarbons are tested. The separated hydrocarbons are separated, and the filtered hydrocarbons (i.e., the recovered crude oil) are stored. The crude oil is thereby recovered from sludge or emulsion through a chemical exothermic reaction and centrifugation to resolve the emulsion into free water, solids and hydrocarbons.

8 Claims, 6 Drawing Sheets

METHOD TO RECOVER CRUDE OIL FROM SLUDGE OR EMULSION

FIELD OF INVENTION

The present invention relates to a method for the recovering of valuable crude oil from sludge and/or emulsion and for the rendering of environmentally safe by products in the form of clean water and clean solids. Emulsion and sludge are unwanted materials derived from the upcoming fluid mixture to Crude Oil Terminals from a production facility.

BACKGROUND ART

Petroleum or crude oil is a naturally occurring liquid found in the Earth Crust consisting of a complex mixture of hydrocarbons most of them alkanes of various densities. Some lighter hydrocarbons are considered natural gas or natural gas liquids, while denser hydrocarbons are more viscous, and the densest are paraffin wax and asphaltenes. It may contain other nonmetallic elements such as sulfur, oxygen, and nitrogen.

During production, crude oil flows in a mixture with water and solids (earth minerals). A fraction of this mixture is an emulsion containing oil water and solids. This emulsion constitute a series of problems for the handling, storaging, transporting and refining of the crude oil.

Emulsion forms upon cooling of the oil water mixture in combination with a significant amount of agitation and pressure differentials from the formation rock to the surface and to the storage facility. Chemicals contained in the crude oil and the water also act in the formation and stabilisation of emulsions. These chemicals in the oil can vary from long chain straight hydrocarbons of paraffinic type to complex heteroatomic polycyclic and bi-polar molecules mostly carboxylic acids and naphthenic acids.

Sandstone formations from where the crude is extracted from provide an excellent base for emulsions. Fine silicon with oxygen compounds which are silicates form anionic crystallites which have a high affinity for water through hydrogen bonding, oil tends to surround these structures forming an emulsion. When the crude oil is being extracted, the pressure decreases, this leads to degassing of carbon dioxide from the formation water and will result in an increase in the pH value. Dissolved metals and bicarbonate in the water intervene in the formation of the carboxylic and naphthenic acids, which develops into an active stabilizing colloidal structures that enhance emulsion formation and also prevent existing emulsions from breaking.

Typical treatments for these emulsion include chemical addition such as de-emulsifiers and/or heating to promote destabilization and emulsion resolution. The use of boilers, furnaces and heat exchangers has been commonly used among the oil producers. Acid based demulsifier is the most common type of chemical used in the industry. Emulsions which are very hard to resolve like the ones formed by carboxylic and naphtenic acids; are difficult or impossible to treat with current state of the art.

Sludge is formed when heavy emulsions and solids settle inside crude oil storage tanks while waiting for further processing. Most of the existing process and methodologies are limited to emulsion resolution without considering the removal of the solid fraction. This causes a series of problems within the storage and transport systems.

Sludge represents a liability for the oil companies due to the environmental problems associated with their disposal even though it still contains high percentages of valuable crude oil. Thus, with further enhancement, a method for recovering crude oil which separates from emulsified fractions is desirable.

The subject matter claimed herein is not limited to embodiments that solve any disadvantages or that operate only in environments such as those described above. Rather, this background is only provided to illustrate one exemplary technology area where some embodiments described herein may be practice.

SUMMARY OF INVENTION

The embodiment of the present invention is a method to recover crude oil by separating and removing valuable hydrocarbon, water and solid components from sludge or an emulsion. The method comprising the steps of receiving a sludge or an emulsion with an added reagent of predefined ratio to form a mixture for treatment, processing the mixture to break a micelle structure of the sludge or the emulsion, agitating the mixture of the sludge or the emulsion with the added reagents to allow homogenization of the mixture, centrifugating the processed mixture to separate hydrocarbons, water and solids from the sludge or the emulsion through a centrifuge, testing hydrocarbons separated from the sludge or the emulsion to ensure separated solids can be disposed of as environmentally safe materials, testing basis solids and water contents of separated hydrocarbons, filtering separated hydrocarbons and storing the filtered hydrocarbons which is the recovered crude oil.

The present invention discloses a method for recovering crude oil from sludge or emulsion through a chemical exothermic reaction and centrifugation for separating emulsion into free water, solids and hydrocarbons. The methodology of the present invention further comprises a secondary treatment to reprocess the separated solids from the centrifugation processes to remove oil fraction from solids. The present invention defines a method for recovering crude oil from sludge or emulsion through a chemical exo thermic reaction and centrifugation to resolving the emulsion into free water, solids and hydrocarbons.

The present invention consists of several novel features and a combination of parts hereinafter fully described and illustrated in the accompanying drawings, it being understood that various changes in the details may be made without departing from the scope of invention or sacrificing any of the advantages of the present invention.

BRIEF DESCRIPTION OF ACCOMPANYING DRAWINGS

To further clarify various aspects of some embodiments of the present invention, a more particular description of the invention will be rendered by references to specific embodiments thereof, which are illustrated, in the appended drawings. It is appreciated that these drawings depict only typical embodiments of the invention and are therefore not to be considered limiting of its scope. The invention will be described and explained with additional specificity and detail through the accompanying drawings in which.

DETAILED DESCRIPTION OF THE PREFERRED EMBODIMENTS

Embodiments of the invention relate to a method to recover crude oil from sludge or emulsion. Hereinafter, this specification will describe the present invention according to the preferred embodiments of the present invention. However, it is to be understood that limiting the description to the preferred embodiments of the invention is merely to facilitate discussion of the present invention and it is envisioned without departing from the scope of the appended claims.

Figure 1:
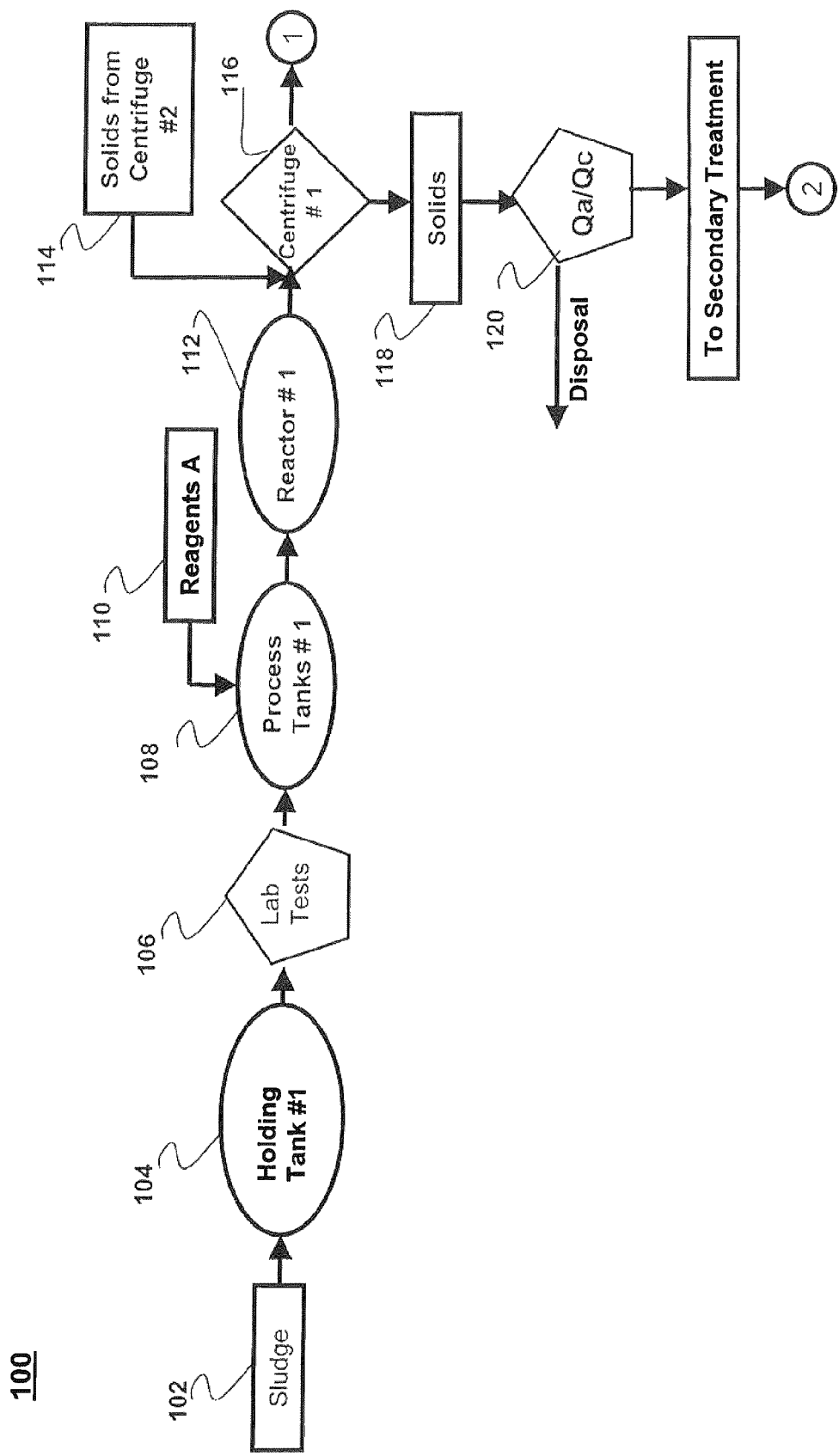
FIGS. 1, 2 and 3 are flowcharts, which illustrates a system arrangement for a method to recover crude oil from sludge or emulsion.
Figure 2:
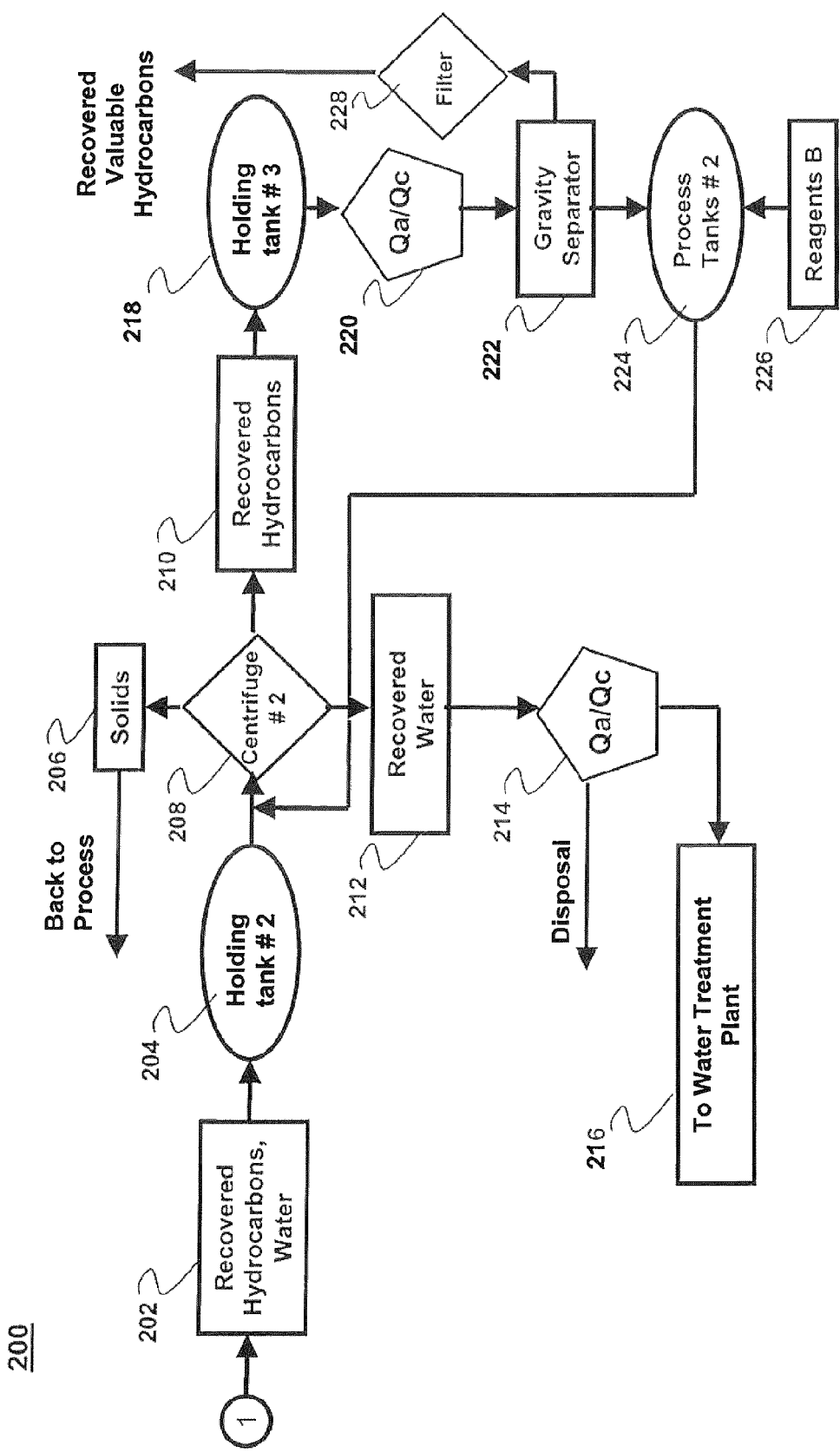
Figure 3:
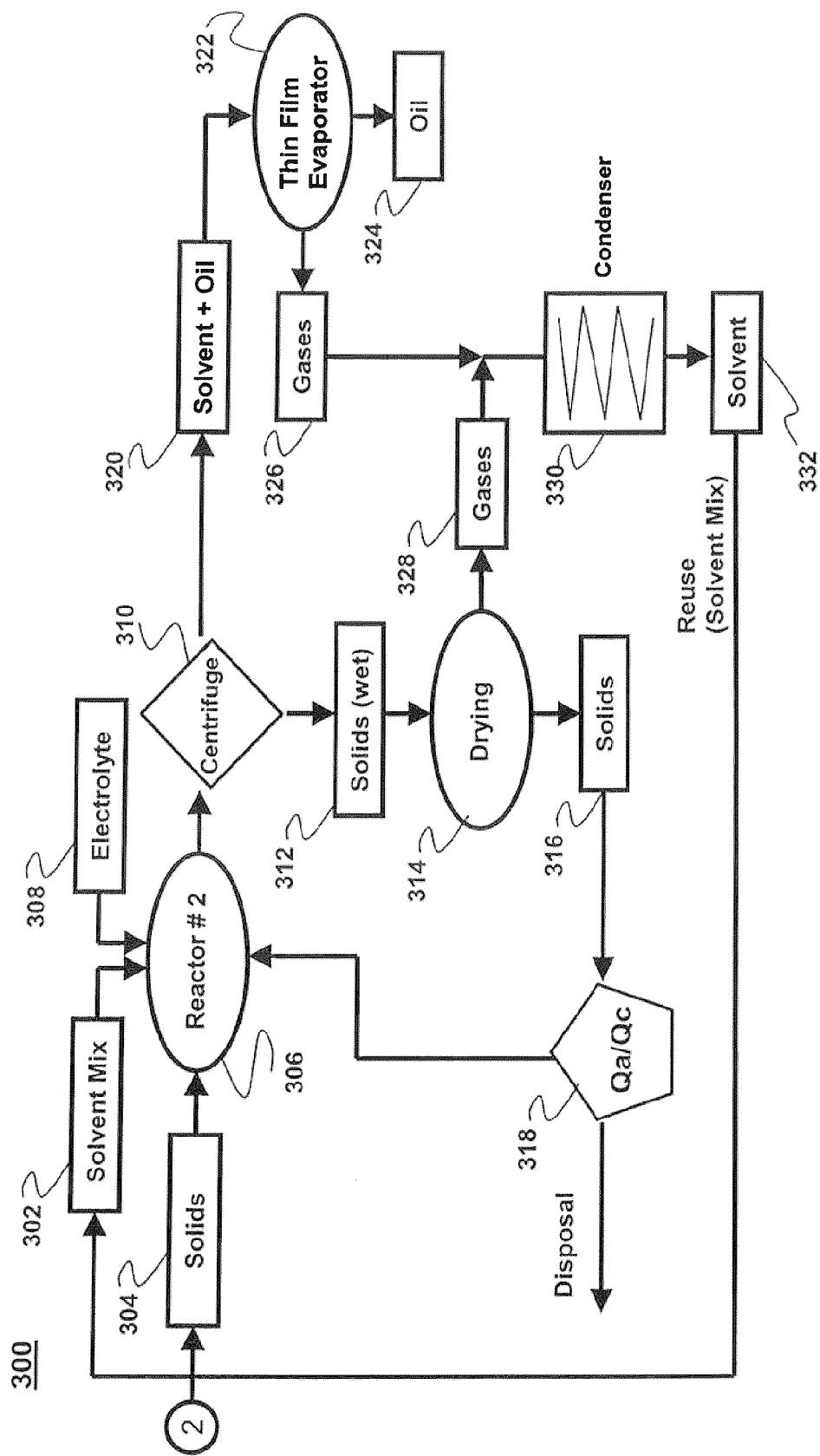
Figure 4:
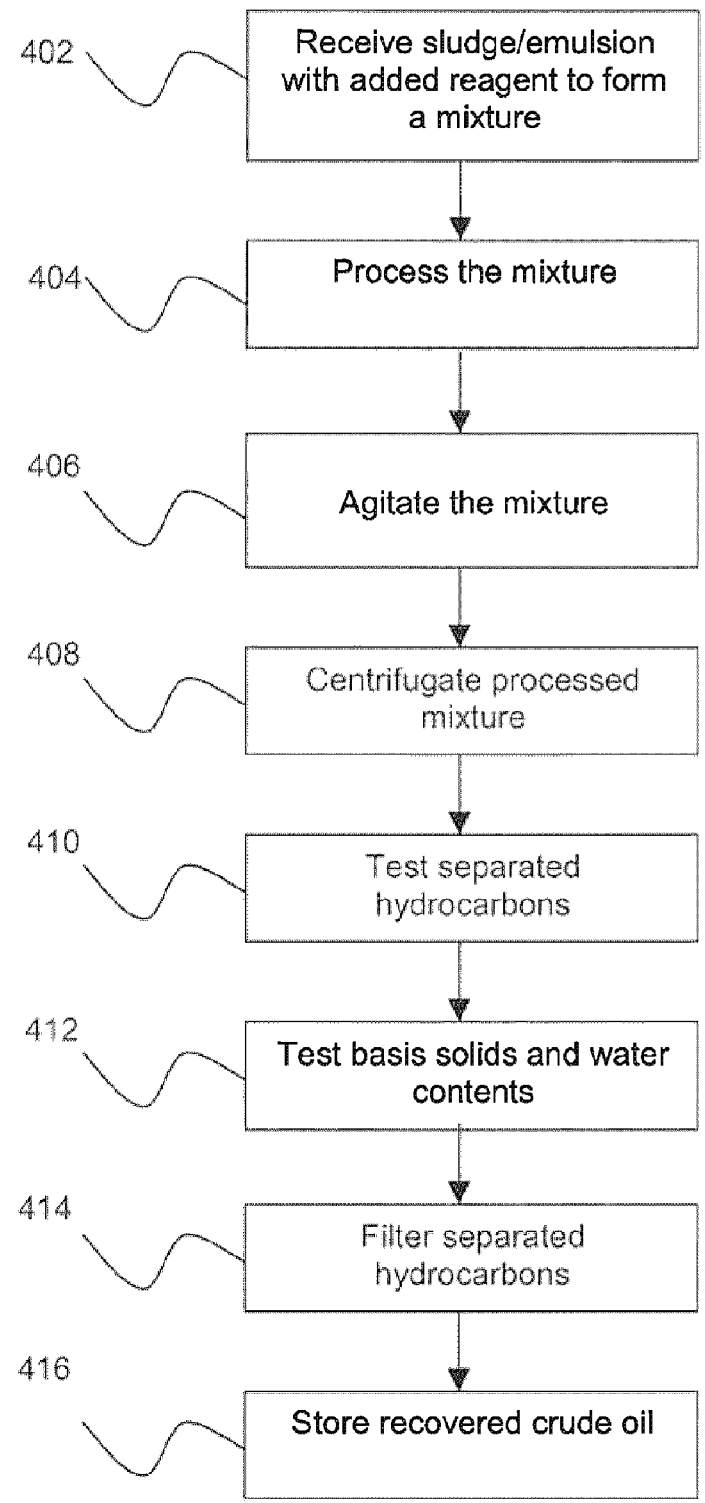
FIG. 4 is a flowchart illustrating a method to recover crude oil by separating and removing valuable hydrocarbon, water and solid components from a sludge or an emulsion.
Figure 5:
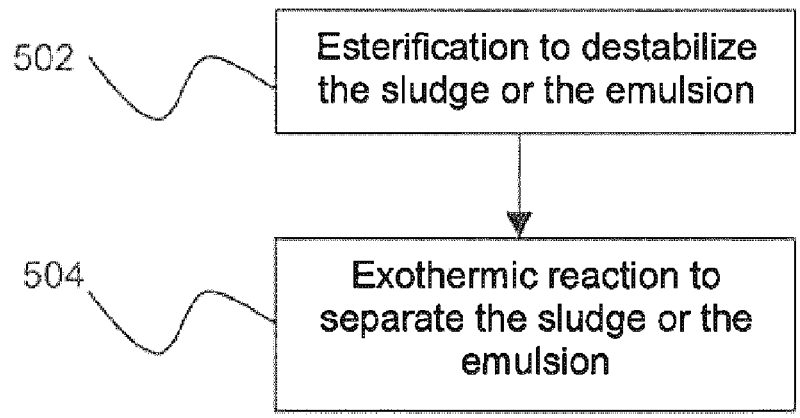
FIG. 5 is a flowchart illustrating a method for processing the mixture to break a micelle structure of the sludge or the emulsion.

Reference is first being made to FIG. 4 and FIG. 5 collectively while FIGS. 1, 2 and 3 is referred to throughout the entire description. FIGS. 1, 2 and 3 are flowcharts, which illustrates a system arrangement for a method to recover crude oil from sludge or emulsion. FIG. 4 is a flowchart illustrating a method to recover crude oil by separating and removing valuable hydrocarbon, water and solid components from a sludge or an emulsion while FIG. 5 is a flowchart illustrating a method for processing the mixture to break a micelle structure of the sludge or the emulsion. The method (400) to recover crude oil by separating and removing valuable hydrocarbon, water and solid components from a sludge or an emulsion, the method (400) comprising the steps of receiving a sludge or an emulsion with added reagents (110) of predefined ratio to form a mixture for treatment (402), processing the mixture to break a micellar structure of the sludge or the emulsion (404), agitating the mixture of the sludge or the emulsion with the added reagent to allow homogenization of the mixture (406), centrifugating the processed mixture to separate hydrocarbons, water and solids from the sludge or the emulsion through a centrifudge (408), testing hydrocarbons separated from the sludge or the emulsion to ensure separated solids can be disposed of as environmentally safe materials (410), testing basis solids and water contents of separated hydrocarbons (412), filtering separated hydrocarbons (414) and storing the filtered hydrocarbons which is recovered crude oil (416).

The process commences by adding reagents (110) of predefined ratio into each specific sludge (102) or emulsion. The ratio of the reagent is determined through a laboratory process (106) where the exact chemical reagents (110), quantities and sequence of addition of the reagents (110) into each specific sludge (102) or emulsion are used for recovery. The method to recover crude oil commences once the ratio of the reagent (110) is determined. The sludge (102) or emulsion is pumped into process tanks (108) where reagents (110) are added according to the predefined ratio based on the laboratory test (106) results to form a mixture for treatment.

There are two basic sequences that can be followed. The method (500) for processing the mixture to break a micellar structure of the sludge or the emulsion, the method comprising the steps of esterification to destabilize the sludge or the emulsion if the sludge or the emulsion contains a considerable amount of naphthenates or asphaltenes (502). During esterification process, an acid of the form A-H where A is an inorganic or organic compound, is added in the amount of 0.5% v-v to 5.0% v-v with an alcohol of the form R—OH where R is an alkyl or cyclic organic form, in the amount of 2.0% v-v to 10% v-v. A continuous agitation is provided to keep the emulsion homogeneous. Another acid of the form A-H where A is an inorganic compound or molecule is added in the amount of 1% v-v to 10% v-v. During this reaction, temperature and pressure of such reaction is continuously monitored.

The mixture of the sludge or emulsion is agitated continuously (406) while the mixture flows to the following process tanks (224). This reaction completely destabilizes the emulsion during the esterification process. Esters produced through the mechanism for esterification reaction dissociates molecular arrangements of the sludge or emulsion and thus destabilize the micelles.

Subsequently, inorganic salt and carbon is added into the mixture of sludge or emulsion. The recovery process commences at this point by adding inorganic salt into the mixture of sludge or emulsion with an added reagent of predefined ratio if naphthenates or asphaltenes is not present in the sludge or emulsion. Sodium and potassium phosphates like trisodium phosphate, and tri potassium phosphate (0.5 g/l of fluid to 5.0 g/l of fluid) and carbon black (0.5 g/l to 3.5 g/l of fluid) is added into the sludge or emulsion aided by continuous agitation for homogenization in the process tank.

A light concentration of electrolyte may be added to enhance the reaction. A perchlorate or permanganate salt is added to the mixture as a catalyst in small quantities while maintaining the agitation as well as the addition of an organic or metallic peroxide like hydrogen peroxide, sodium peroxide or zinc peroxide.

Thereafter, the liquid travels to the reactor (112) where an exothermic reaction evolves that allows for the separation of the sludge or emulsion into hydrocarbons, water and solid (504). Continuous agitation is provided to allow homogenization of the mixture. During this reaction, temperature and pressure of such reaction is continuously monitored. Micro bubbles or vapor gases, which evolves during the exothermic reaction, breaks the micellar structure of the sludge or the emulsion and allows the solids and water to break free. The reacted mixture is then centrifuged using a decanter centrifuge (116) where the solids (118) are separated. The overflow of the centrifuge contains mainly oil and water. Sometimes the smaller solids, which are less than 10 micron, are suspended in the water and it may also contain a small amount of an inverted emulsion, which is referred to as heavy phase.

Figure 6:
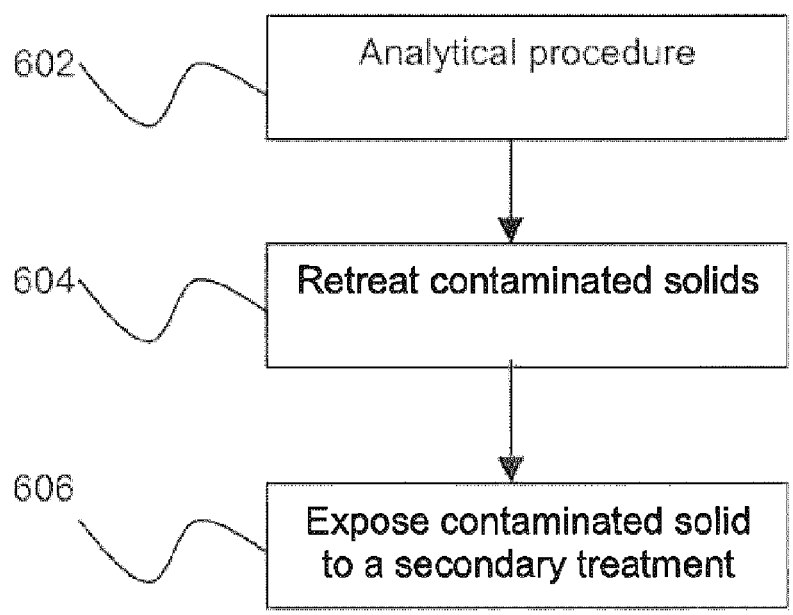
FIG. 6 is a flowchart illustrating a method for testing hydrocarbons separated from the sludge or the emulsion to ensure separated solids can be disposed of as environmentally safe materials.

Reference is now being made to FIG. 6. FIG. 6 is a flowchart illustrating a method for testing hydrocarbons separated from the sludge or the emulsion to ensure separated solids can be disposed of as environmentally safe materials. The method for testing hydrocarbons separated from the sludge or the emulsion to ensure separated solids can be disposed of as environmentally safe materials further comprises analytical procedures to determine total petroleum hydrocarbon content and toxicity characteristics leaching procedure to ensure safe disposal of separated solids (602), retreating contaminated solids if failure is observed in the analytical procedures (604) and exposing contaminated solids to a secondary treatment for further treatment (606) when hydrocarbon content do not permit an environmentally safe disposal.

The separated hydrocarbons will be tested on the basis solids and water content (BS&W). If the basis solids and water content test is satisfactory then the recovered hydrocarbons will be sent through a filter (228) to a final storage tank. In contrary, they will be sent to a polishing process using a three-phase separation centrifuge (208) in order to separate the remaining water and solids compound.

Consequently, a three-phase centrifuge (208) is used to separate the heavy phase, the oil and remaining solids. In some cases, strong water in oil emulsion formed basically with carboxylic or naphthenic acids remain. This invert emulsions are much harder to separate and contain generally a lower amount of water.

Figure 7:
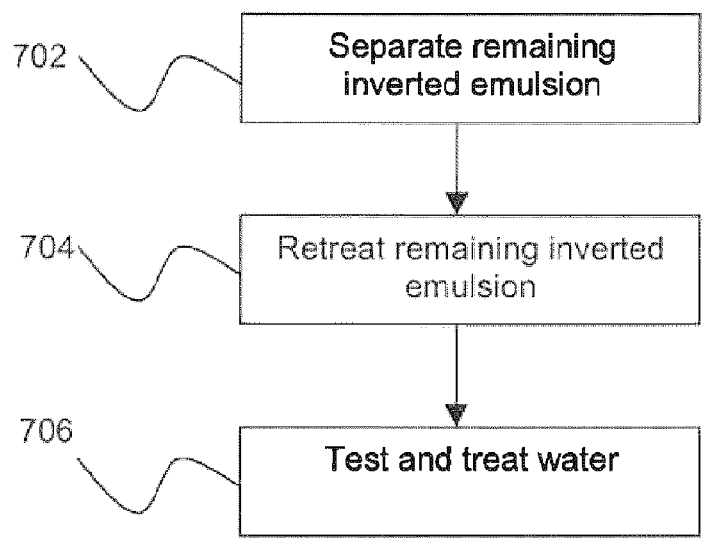
FIG. 7 is a flowchart illustrating a method for further processing remaining inverted emulsion from further centrifugation.

Reference is now being made to FIG. 7. FIG. 7 is a flowchart illustrating a method for further processing remaining inverted emulsion from further centrifugation. The method for further processing remaining inverted emulsion from further centrifugation comprises the steps of separating remaining inverted emulsion through a gravity separator in a holding tank (702). The heavy phase is sent to a holding tank (218) for a gravity separation through a gravity separator (222). Thereafter, the method comprises retreating separated inverted emulsion through esterification (404) and testing and treating (214) recovered water to remove suspended solids for disposal (406). The water is tested and treated as recycled water as required to remove suspended solids through a coagulation or flocculation process using ionic polymers.

Figure 8:
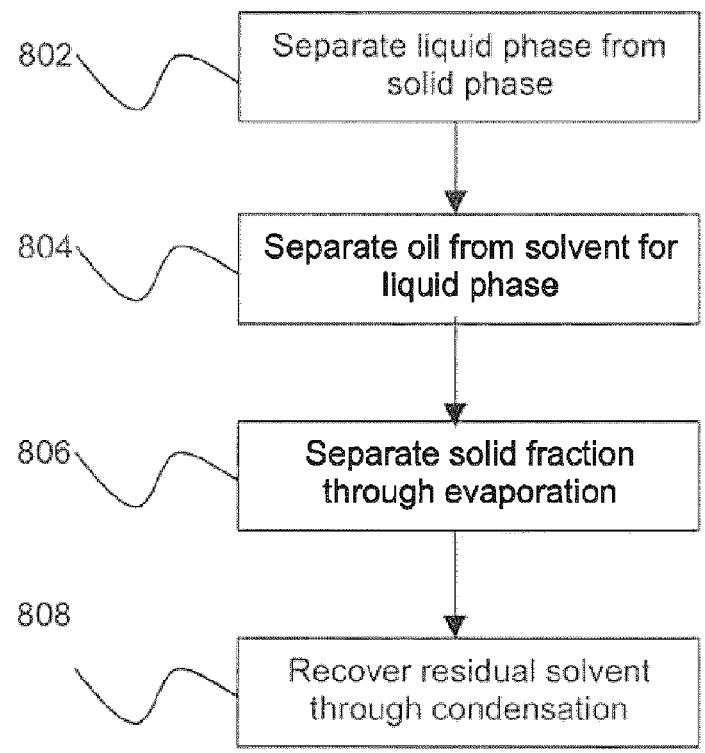
FIG. 8 is a flowchart illustrating a method for further processing in the secondary treatment.

Reference is now being made to FIG. 8. FIG. 8 is a flowchart illustrating a method for further processing in the secondary treatment. A secondary treatment is used to reprocess separated solids from both centrifuges to remove oil fraction from solids and a light electrolyte is added to make a separation phase. These solids are either reprocessed using the same process or can be further cleaned and disposed.

Solids separated from both centrifuges (116, 208) are added with an organic solvent (302) and mixed thoroughly to form slurry in a reactor (306). The organic solvent is selected from esters, alcohols, acetates, ketones. A light electrolyte (308) is added to the mixture at a concentration of equal to or less than 12.0% v/v in an amount of 300 ml/l to 750 ml/l. After the reaction, the liquid phase will be separated from the solid phase in the secondary treatment through centrifugation (802). For liquid phase, oil from a solvent (320) will be separated in the liquid fraction through evaporation process (804) while solid fraction is separated from a residual solvent through evaporation (806) process. The solvent in the separation process is vaporized under vacuum and recovered through a condensation process (808).

The separated liquid phase from solid phase through centrifugation further comprises testing (318) of separated solids to determine total petroleum hydrocarbon content and toxicity characteristics leaching procedure. The dry solids (316) after the separation process are disposed. These dry solids contain not more than 3% oil by weight.

The approach introduced in the present invention is an absolute enhancement as it allows emulsified fractions to be separated. The methodology includes recovering valuable hydrocarbons from sludge or emulsion, separating unwanted water from sludge or emulsion, separating unwanted solids from sludge or emulsion through esterification and exothermic reaction.

The present invention may be embodied in other specific forms without departing from its essential characteristics. The described embodiments are to be considered in all respects only as illustrative and not restrictive. The scope of the invention is, therefore indicated by the appended claims rather than by the foregoing description. All changes, which come within the meaning and range of equivalency of the claims, are to be embraced within their scope.

The invention claimed is:

1. A method to recover crude oil by separating and removing valuable hydrocarbon, water and solid components from sludge or an emulsion, the method comprising the steps of:
   receiving a sludge or an emulsion with added reagents of predefined ratio to form a mixture for treatment;
   processing the mixture to break a micelle structure of the sludge or the emulsion;
   agitating the mixture of the sludge or the emulsion with added reagents to allow homogenization of the mixture;
   centrifugating the processed mixture to separate hydrocarbons, water and solids from the sludge or the emulsion through a centrifuge;
   testing hydrocarbons separated from the sludge or the emulsion to ensure separated solids can be disposed of as environmentally safe materials;
   testing basis solids and water contents of separated hydrocarbons;
   filtering separated hydrocarbons; and
   storing the filtered hydrocarbons which is recovered crude oil.

2. The method according to claim 1, wherein processing the mixture to break a micelle structure of the sludge or the emulsion further comprises the steps of:
   esterification to destabilize the sludge or the emulsion if the sludge or the emulsion contains a considerable amount of naphthenates or asphaltenes; and
   exothermic reaction to separate the sludge or emulsion into water and solids.

3. The method according to claim 1, wherein centrifugating the processed mixture to separate hydrocarbons, water and solids from the sludge or the emulsion through a centrifuge comprises further centrifugation on overflow of the centrifuge to separate inverted emulsion, oil and remaining solids.

4. The method according to claim 1, wherein testing hydrocarbons separated from the sludge or the emulsion to ensure separated solids can be disposed of as environmentally safe materials further comprises of:
   analytical procedures to determine total petroleum hydrocarbon content and toxicity characteristics leaching procedure to ensure safe disposal of separated solids;
   retreating contaminated solids if failure is observed in the analytical procedures; and
   exposing contaminated solids to a secondary treatment for further treatment.

5. The method according to claim 3, wherein remaining inverted emulsion from further centrifugation further comprises the steps of:
   separating remaining inverted emulsion through a gravity separator in a holding tank;
   retreating separated inverted emulsion through esterification; and
   testing and treating recovered water to remove suspended solids for disposal.

6. The method according to claim 4, wherein the secondary treatment further comprises the steps of reprocessing separated solids from both centrifuges to remove oil fraction from solids and a light electrolyte is added to make a separation phase.

7. The method according to claim 6, wherein the secondary treatment further comprises the steps of:
   separating liquid phase from solid phase through centrifugation;
   separating oil from a solvent for liquid phase through evaporation;
   separating solid fraction from a residual solvent through evaporation; and
   recovering the residual solvent through condensation.

8. The method according to claim 7, wherein separating liquid phase from solid phase through centrifugation further comprises testing of separated solids to determine total petroleum hydrocarbon content and toxicity characteristics leaching procedure.

\* \* \* \* \*